E. H. MESSITER.
SHIP TRIMMING APPARATUS.
APPLICATION FILED APR. 6, 1918.
1,272,074.
Patented July 9, 1918.
2 SHEETS—SHEET 1.
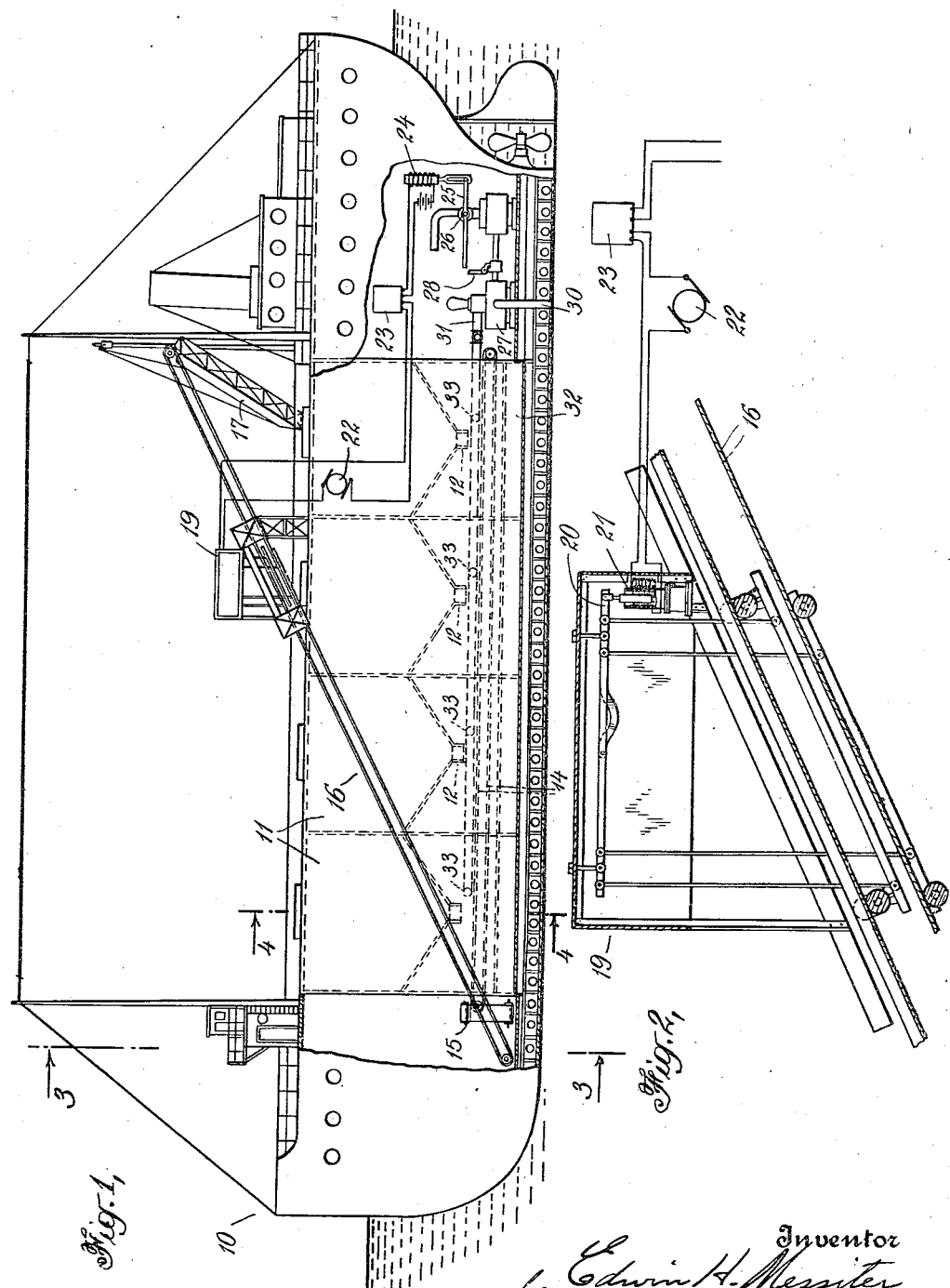

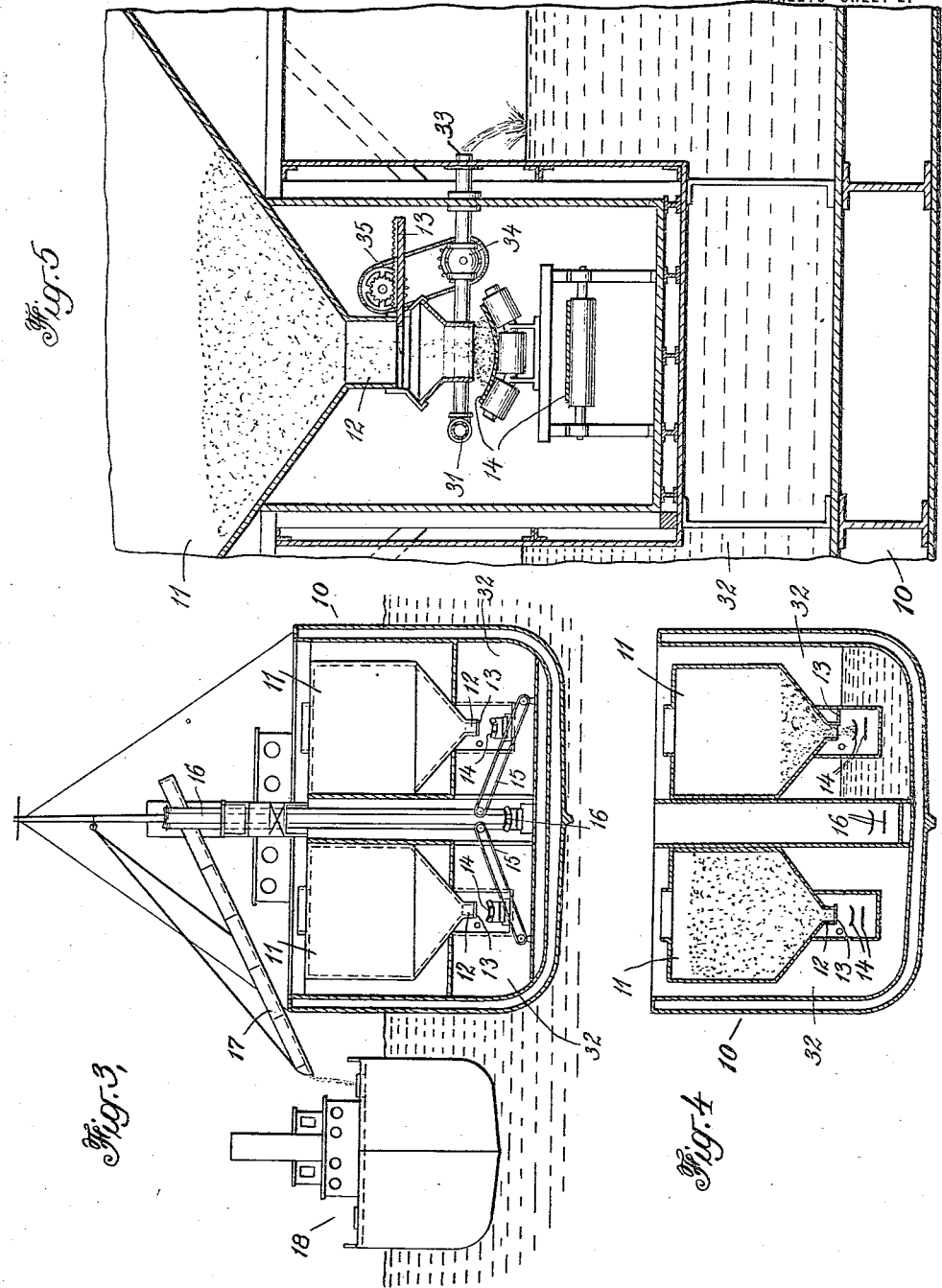

UNITED STATES PATENT OFFICE.

EDWIN H. MESSITER, OF BROOKLYN, NEW YORK, ASSIGNOR TO ELECTRIC WEIGHING COMPANY, A CORPORATION OF NEW YORK.

SHIP-TRIMMING APPARATUS.

1,272,074.          Specification of Letters Patent.         Patented July 9, 1918.

Application filed April 6, 1918. Serial No. 227,034.

*To all whom it may concern:*

Be it known that I, EDWIN H. MESSITER, a citizen of the United States of America, and a resident of Brooklyn, Kings county, and State of New York, have invented certain new and useful Improvements in Ship-Trimming Apparatus, of which the following is a specification, reference being had to the accompanying drawings, forming a part thereof.

My invention relates to ship trimming apparatus, and its object is to provide a simple automatic apparatus by means of which the discharge of a load from a vessel will not affect the position of the vessel in the water.

More specifically, its object is to combine with a continuous weigher for the cargo, a device for balancing with water the cargo which passes over the scale. In its broadest aspect the object of the invention is to control automatically the flow of a liquid in proportion to the load passing over a continuous weigher.

In order that my invention may be thoroughly understood, I will now proceed to describe the same in the following specification, and will then point out the novel features thereof in appended claims.

Referring to the drawings:

Figure 1 is a side elevation partly in section, of a cargo vessel with apparatus installed therein which is made according to and embodies the present invention.

Fig. 2 is a sectional side elevation of a continuous weigher of a type which I have invented which may be used to control other parts of the apparatus.

Fig. 3 is a sectional end elevation of the vessel shown in Fig. 1, the section being taken on the line 3—3 of the latter figure with another vessel shown alongside.

Fig. 4 is a similar section taken on the line 4—4 of Fig. 1.

Fig. 5 is an enlarged sectional end elevation through the center of one of the cargo bins.

Like characters designate corresponding parts in all the figures.

10 designates a vessel of well known form which is constructed with a plurality of cargo bins or hoppers 11, the lower end of each of which has a discharge chute 12 controlled by a gate 13. The cargo bins are shown as commonly constructed in two longitudinal rows with belt conveyers 14—14 under them. At the discharge end of these conveyers are transverse conveyers 15—15 which deliver the material from the bins to an inclined conveyer 16 which carries up to a swinging chute 17 through which the material is discharged, as into a boat 18. It is desirable to weigh the material as it is discharged, and for that purpose a conveyer or scale, designated generally by the reference numeral 19, is placed in the conveyer 16.

The form of conveyer scale shown is that fully described in Patent No. 1,014,604 issued to me January 9, 1912. As shown in Fig. 2, it comprises a scale beam 20 which influenced by the load passing over the conveyer, adjusts a variable rheostat 21 in the circuit of a dynamo 22 driven by the conveyer 16. An electric meter 23 also in this circuit is arranged to close a contact every time a predetermined weight of material passes over the conveyer 16, which contact is usually employed to control a circuit to a counter or register. In so far as this invention is concerned, other forms of conveyer scales or continuous weighers may be used.

In this case the contact of the meter is also utilized to control a water pump by closing a circuit through a solenoid 24 to rock an arm 25 to open a steam valve 26. This is arranged to give one complete forward and return stroke to the piston of the pump 27, a pivoted lever 28 on the pump piston being provided to rock the arm back to its initial position and to shut off the steam at the end of the return stroke. The pump is of such size that the water delivered by this operation will weigh the same as the material on conveyer 16 which has caused the energization of the solenoid 24. For example, the unit of weight passing through the weigher 19 which is sufficient to cause the meter 23 to close the solenoid circuit, may be one hundred pounds, in which case a pump which in one cycle of its stroke delivers one hundred pounds of water is used.

The suction pipe of the pump is designated by 30 and its discharge pipe by 31. Adjacent each cargo bin is a water ballast compartment 32 and from the pump discharge pipe 31 are branch pipes 33 leading through valves 34 to these compartments. The gate 13 and valve 34 of each pin and compartment are connected together as by a sprocket and chain arrangement 35 so that when the gate of a selected bin is opened, the valve of its water ballast compartment will be opened also.

The operation of this apparatus is obvious. When the gate 13 and valve 34 of one of the cargo bins is opened and the conveyers set in motion, the grain, coal, ore or whatever material is in this bin, will be taken from this bin and an amount of water of like weight will be added to its water ballast compartment. Consequently the buoyancy of the vessel will not be disturbed. Not only is the vessel kept at the same depth during the process of unloading, but it is prevented from listing or tilting fore and aft. This is advantageous not only from the ease of unloading the cargo but is especially important in connection with keeping the automatic weigher level in order to maintain its accuracy.

It may be seen that without departing from the scope and spirit of this invention, it may be used wherever it is desired to move a given weight of one material in proportion to the weight moved of another material. I therefore intend no limitations other than those imposed by the appended claims.

What I claim is:

1. In a vessel, a bin, adapted to hold movable material, a water ballast compartment, a conveyer arranged to move said material, a weigher in the conveyer, a pump connected with the compartment, and means controlled by the weigher for actuating the pump to move a quantity of water proportional in weight to the weight of material passing over the conveyer.

2. In a vessel, a cargo receptacle adapted to hold a movable material, a conveyer arranged to vary the quantity of said material, a weigher in said conveyer, a water ballast compartment, a pump connected with said compartment, and means controlled by the weigher for actuating the pump to vary the water in said compartment in inverse proportion to the variation of material in said receptacle.

3. In a vessel, a plurality of bins adapted to hold movable material, a plurality of water ballast compartments, a conveyer arranged to vary the quantity of said material in a desired bin, a weigher in said conveyer, a pump, means for connecting the pump with any of said compartments, and means controlled by the weigher for actuating the pump to vary the quantity of water in a desired compartment proportional in weight to the weight of material passing over the conveyer.

4. In a vessel, a plurality of bins adapted to hold a movable material, a plurality of water ballast compartments each in proximity to one of said bins, a conveyer arranged to vary the quantity of said material in a desired bin, a weigher in said conveyer, a pump, means for connecting the pump with any of said compartments, and means controlled by the weigher for actuating the pump, to vary the quantity of water in a desired compartment in inverse proportion to the variation of material in the proximate bin.

5. In a vessel, a plurality of bins adapted to hold a movable material, a discharge gate for each bin, a plurality of water ballast compartments each in proximity to one of said bins, a conveyer arranged to move the material discharged from each bin through its respective gate, a weigher in said conveyer, a pump, pipes leading from the pump to said compartments, a valve for each compartment, a mechanical connection between each gate and the valve for its proximate compartment, and means controlled by the weigher for actuating the pump to move water into the compartment in proximity to the bin from which material is discharged.

6. In combination with a conveyer, a weigher therein, a pump, and means controlled by the weigher for actuating the pump.

7. In combination with a conveyer, a weigher therein, a pump, means controlled by the weigher for intermittently actuating the pump to move a desired amount of fluid when a desired weight of material passes the weigher.

8. In combination with a conveyer, a weigher therein arranged to close an electric circuit when a desired weight of material passes the weigher, a pump, means for actuating the pump, and electro-magnetic means in said electric circuit for controlling the pump actuating means.

9. In combination with a conveyer, a weigher therein arranged to close an electric circuit when a desired weight of material passes the weigher, a pump, means for actuating the pump, electro-magnetic means in said electric circuit for controlling the pump actuating means to start the pump, and other means actuated by the pump for stopping the pump actuating means after the pump has moved a desired amount of fluid.

In witness whereof, I have hereunto set my hand this 5 day of April, 1918.

EDWIN H. MESSITER.